(12) United States Patent
Bristol et al.

(10) Patent No.: US 10,540,897 B1
(45) Date of Patent: Jan. 21, 2020

(54) METHOD AND SYSTEM OF AGGREGATING VEHICLE DATA TO SUPPORT VEHICLE INVESTIGATIONS

(71) Applicant: Crashtrac, Seaside, CA (US)

(72) Inventors: Jason Franklin Bristol, Pacific Grove, CA (US); Steven James Hall, Seaside, CA (US)

(73) Assignee: Crashtrac, Seaside, CA (US)

( * ) Notice: Subject to any disclaimer, the term of this patent is extended or adjusted under 35 U.S.C. 154(b) by 711 days.

(21) Appl. No.: 15/188,716

(22) Filed: Jun. 21, 2016

(51) Int. Cl.
| | | |
|---|---|---|
| *G06F 16/00* | (2019.01) | |
| *G08G 1/00* | (2006.01) | |
| *G06Q 40/08* | (2012.01) | |
| *G06F 16/951* | (2019.01) | |
| *G06Q 50/18* | (2012.01) | |

(52) U.S. Cl.
CPC ........... *G08G 1/205* (2013.01); *G06F 16/951* (2019.01); *G06Q 40/08* (2013.01); *G06Q 50/18* (2013.01)

(58) Field of Classification Search
CPC . G08G 1/205; G06F 17/30864; G06F 16/951; G06F 16/205; G06Q 40/08; G06Q 50/18
See application file for complete search history.

(56) References Cited

U.S. PATENT DOCUMENTS

| | | | | |
|---|---|---|---|---|
| 8,560,161 | B1* | 10/2013 | Kator ................... | G06Q 10/087 701/29.6 |
| 2004/0199785 | A1* | 10/2004 | Pederson ........... | G07C 9/00158 340/293 |
| 2012/0106801 | A1* | 5/2012 | Jackson ............... | G08G 1/0175 382/105 |
| 2014/0025681 | A1* | 1/2014 | Raines .................. | G06Q 30/00 707/740 |
| 2014/0039935 | A1* | 2/2014 | Rivera .................. | G06Q 40/08 705/4 |
| 2015/0019447 | A1* | 1/2015 | Baughman ............ | G06Q 10/20 705/305 |
| 2016/0133066 | A1* | 5/2016 | Lavie ....................... | G07C 5/08 701/31.4 |

* cited by examiner

*Primary Examiner* — Tamara T Kyle
*Assistant Examiner* — Lahcen Ennaji
(74) *Attorney, Agent, or Firm* — Hawley Troxell Ennis & Hawley LLP; Rivkah Young; Philip McKay

(57) ABSTRACT

A method and system of aggregating vehicle data to support vehicle investigations, according to one embodiment. In one embodiment, the method and system provides a vehicle search system. In one embodiment, the vehicle search system receives vehicle data. In one embodiment, the vehicle search system receives search data associated with a target vehicle. In one embodiment, the vehicle search system matches the vehicle data with the search data. In one embodiment, if the vehicle search system matches the vehicle data with the search data, alert data is provided.

6 Claims, 6 Drawing Sheets

501

503

DEAR OFFICER JONES,

A VEHICLE HAS BEEN IDENTIFIED MATCHING THE FOLLOWING DESCRIPTION:
MAKE: CADILLAC
MODEL: DEVILLE
YEAR: 1976
COLOR: WHITE
DAMAGE: RIGHT FRONT FENDER
WITHIN: 100 MILES OF 93955

YOU CAN ACCESS MORE INFORMATION ABOUT THIS VEHICLE BY CLICKING THE FOLLOWING LINK: MATCH.DATABASE.COM

SINCERELY,
DATABASE

METHOD AND SYSTEM OF AGGREGATING VEHICLE DATA TO SUPPORT VEHICLE INVESTIGATIONS

BACKGROUND

Despite the severe consequences associated with leaving the scene of a vehicular accident, hit-and-run incidents are on the rise. Even more troubling, the number of fatalities resulting from hit-and-run collisions is increasing, even though the number of fatalities resulting from traffic accidents has decreased overall.

Furthermore, analysis of hit-and-run crashes shows that "about one in five of all pedestrian fatalities are hit-and-runs, and 60% of hit-and-run fatalities have pedestrians as victims." Larry Copeland, *Fatal Hit-and-Run Crashes on the Rise in U.S.*, USA TODAY, Nov. 10, 2013. Thus, not only are the incidences of hit-and-runs increasing, hit-and-run collisions are of significant consequence.

Hit-and-runs are often extremely difficult to prosecute. Larry Stevenson, a former Denver police officer, says that "'[h]it-and-run accidents are one of the most unsolvable crimes[ ] . . . . You are looking for a ghost. Rarely do victims have good information of what hit them.'" Jeremy P. Meyer, *Denver's Medina Alert Gets Public Involved in Solving Hit-and-Runs*, DENVER POST, Apr. 30, 2016.

In an attempt to prevent and prosecute hit-and-run incidents, many states are implementing hit-and-run notification systems to notify the public of hit-and-run collisions, in the hope that a member of the public will have and provide information to the appropriate law enforcement agency, leading to an arrest. California Assemblyman Mike Gatto explained that he was proposing a hit-and-run notification system in California because "'[t]o reduce the number of hit-and-runs, you have to actually have some people get caught . . . . In many cases, the injuries are preventable, and in many cases—particularly in rural areas—the person who's in the best position to render aid is the one who caused the accident. So we're really just trying to get people to stop.'" Alayna Shulman, *Yellow Alert to Target Hit-and-Run Drivers*, REDDING RECORD SEARCHLIGHT, Dec. 26, 2015.

Problematically, of course, these hit-and-run notification systems are limited in geographic scope and by available resources. For example, under California's "Yellow Alert" hit-and-run notification system, a suspect's name, license plate number, or vehicle description is broadcast onto the state's freeways via an electronic road sign. Yet, the system is only available for those crashes causing serious injury or death and for those crashes occurring on freeways controlled by the California Highway Patrol. Law enforcement agencies can only take advantage of California's Yellow Alert system for crashes occurring in local jurisdictions if the crashes are reported to the California Highway Patrol.

Furthermore, many bureaucratic steps are often required to activate a hit-and-run notification system. For example, if a hit-and-run incident is reported to a California law enforcement agency, the agency must first determine whether the Yellow Alert requirements have been met and then request that the California Highway Patrol activate the Yellow Alert. Cal. Gov. Code § 8594.15(b)(1).

These requirements are significant. In California, a hit-and-run notification will only be activated if all of the following conditions are met:

(1) A person has been killed or has suffered serious bodily injury due to a hit-and-run incident.

(2) There is an indication that a suspect has fled the scene utilizing the state highway system or is likely to be observed by the public on the state highway system.

(3) The investigating law enforcement agency has additional information concerning the suspect or the suspect's vehicle, including, but not limited to, any of the following:

(A) The complete license plate number of the suspect's vehicle.

(B) A partial license plate number and additional unique identifying characteristics, such as the make, model, and color of the suspect's vehicle, which could reasonably lead to the apprehension of the suspect.

(C) The identity of the suspect.

Id. at § 8594.15(c).

After the California law enforcement agency determines that the Yellow Alert requirements described above have been met, the California Highway Patrol must then also determine whether the Yellow Alert requirements have been met. Id. at § 8594.15(b)(1). Only then, and only if resources are available, will the California Highway Patrol activate the notification.

Even if the hit-and-run notification request makes it through these bureaucratic hurdles, the notification still may not be made public. If multiple hit-and-run notifications are requested, the notifications may be prioritized according to, for example, "the severity of the injury, the time elapsed between a hit-and-run, the incident and the request, or the likelihood that an activation would reasonably lead to the apprehension of a suspect." Id. at § 8594.15(b)(4).

Finally, if the hit-and-run notification is activated, it is only visible on electronic highway signs in a geographically limited area.

Thus, the problem of coordinating notifications with respect to hit-and-run incidents is a serious issue, yet existing technology makes it impossible for law enforcement agencies to quickly and accurately disseminate and gather information relating to these crimes. What is needed is a method and system for aggregating vehicle data to support vehicle investigations.

SUMMARY

Embodiments of the present disclosure address some of the shortcomings associated with the use of traditional hit-and-run notification systems for investigating hit-and-run incidents by providing methods and systems for aggregating vehicle data from various entities including auto body shops, government agencies including law enforcement agencies, vehicle history reporting entities, insurance companies, and the general public.

In one embodiment, a vehicle search system aggregates data relating to vehicles.

In one embodiment, a vehicle is brought to an auto body shop for repairs. In one embodiment, the auto body shop provides vehicle data, i.e. details about the vehicle and damage to the vehicle, to the vehicle search system. In one embodiment, the vehicle search system stores vehicle data from multiple auto body shops.

In one embodiment, the auto body shop uses an estimate generating system to generate auto body repair estimates. In one embodiment, the estimate generating system is associated with the vehicle search system.

In one embodiment, a law enforcement agency and/or law enforcement officer identifies characteristics of one or more target vehicles, i.e. vehicles believed to be associated with a crime. In one embodiment, the law enforcement agency accesses the vehicle search system. In one embodiment, the law enforcement agency provides search data to the vehicle search system.

In one embodiment, the vehicle search system searches stored vehicle data for vehicles matching the search data provided by the law enforcement agency.

For example, in one embodiment, a law enforcement officer investigating a hit-and-run accident determines from eyewitnesses that a white, late-model, four-door sedan hit a victim and left the scene. In one embodiment, the law enforcement officer determines that the sedan likely has damage on its right front fender as a result of the collision.

In one embodiment, the law enforcement officer accesses the vehicle search system and provides search parameters including "white," "sedan," "four-door," "2006 or newer," and "right front fender damage."

In one embodiment, the vehicle search system searches the vehicle data provided by auto body shops using the search data representing the search parameters.

In one embodiment, the vehicle search system provides results of the search to the law enforcement officer. In one embodiment, the vehicle search system searches the vehicle data and provides results of the search to the law enforcement officer over a period of time. For example, in one embodiment, the vehicle search system searches the vehicle data and provides results of the search to the law enforcement officer on a daily basis until the law enforcement officer halts the search.

These embodiments and other embodiments are disclosed in further detail below.

Embodiments of the present disclosure address some of the shortcomings associated with existing hit-and-run notification systems, which fail to utilize the power of data aggregation and modern computing systems. A vehicle search system, in accordance with one or more of the embodiments disclosed herein, provides a powerful tool for law enforcement investigations by aggregating and analyzing data relating to vehicles with body damage in a potentially unlimited geographic range. One or more of the embodiments disclosed herein allow law enforcement agencies to search aggregated data for vehicles with specific characteristics and receive alerts when vehicles matching those characteristics are identified.

The various embodiments of the disclosure can be implemented to improve the technical fields of law enforcement, crime investigation, data collection, and data processing. Therefore, the various described embodiments of the disclosure and their associated benefits amount to significantly more than an abstract idea. In particular, by aggregating and searching vehicle data, a vehicle search system allows its users, including law enforcement agencies, to conduct previously impossible vehicle searches.

The result is a powerful and accurate method and system of aggregating vehicle data to support vehicle investigations, which has never before been available. This method and system of aggregating vehicle data to support vehicle investigations allows for robust data aggregation and searching with minimal human and processor resources being dedicated to data aggregation and searching because more accurate and efficient aggregating and searching methods can be implemented, i.e., fewer processing and memory storage assets; less memory and storage bandwidth being dedicated to buffering and storing data; less communication bandwidth being utilized to transmit data.

The disclosed method and system of aggregating vehicle data to support vehicle investigations does not encompass, embody, or preclude other forms of innovation in the area of data aggregation, law enforcement investigation, or searching technologies. In addition, the disclosed method and system of aggregating vehicle data to support vehicle investigations is not related to any fundamental data processing practice, mental steps, or pen and paper based solutions. In fact, the disclosed method and system of aggregating vehicle data to support vehicle investigations is directed to providing solutions to new and existing problems associated with law enforcement investigations that would otherwise be impossible without the vehicle searching system disclosed herein. Consequently, the disclosed method and system of aggregating vehicle data to support vehicle investigations is not directed to an abstract idea.

BRIEF DESCRIPTION OF THE DRAWINGS

FIG. 5 is an example of an alert, in one embodiment.

Figure 1:
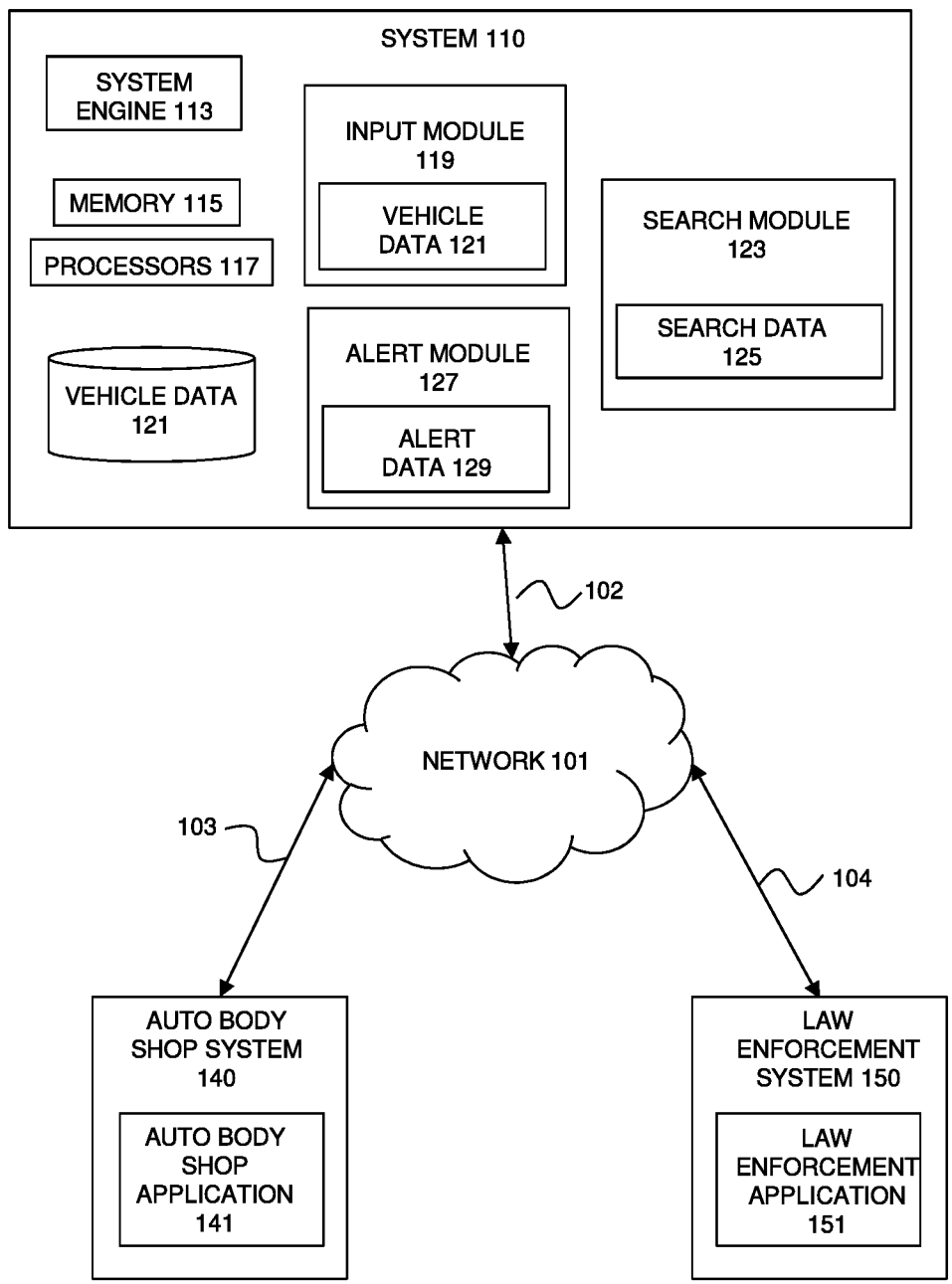
FIG. 1 is a block diagram of a production environment for a method and system of aggregating vehicle data to support law enforcement, in accordance with one embodiment.

Common reference numerals are used throughout the figures and the detailed description to indicate like elements. One skilled in the art will readily recognize that the above figures are examples and that other architectures, modes of operation, orders of operation, and elements/functions can be provided and implemented without departing from the characteristics and features of the invention, as set forth in the claims.

Term Definitions

As used herein, the terms "computing system," "computing device," and "computing entity," include, but are not limited to, the following: a virtual asset; a server computing system; a workstation; a desktop computing system; a mobile computing system, including, but not limited to, smart phones, cellular phones, portable devices, and/or devices worn or carried by a user; a database system or storage cluster; a switching system; a router; any hardware system; any communications system; any form of proxy system; a gateway system; a firewall system; a load balancing system; and/or any device, subsystem, or mechanism that includes components that can execute all, or part, of any one of the processes and/or operations as described herein.

In addition, as used herein, the terms "computing system," "computing device," and "computing entity," can denote, but are not limited to the following: systems made up of multiple virtual assets, server computing systems, workstations, desktop computing systems, mobile computing systems, database systems or storage clusters, switching systems, routers, hardware systems, communications systems, proxy systems, gateway systems, firewall systems, load balancing systems, and/or any devices that can be used to perform the processes and/or operations as described herein.

Herein, the terms "mobile computing system" and "mobile device" are used interchangeably and include, but are not limited to the following: a smart phone; a cellular phone; a digital wireless telephone; a tablet computing system; a notebook computing system; any portable computing system; a two-way pager; a Personal Digital Assistant (PDA); a media player; an Internet appliance; devices worn or carried by a user; or any other movable/mobile device and/or computing system that includes components that can execute all, or part, of any one of the processes and/or operations as described herein.

Herein, the term "production environment" includes the various components, or assets, used to deploy, implement, access, and use, a given application as that application is intended to be used. In various embodiments, production environments can include multiple assets that are combined, communicatively coupled, virtually and/or physically connected, and/or associated with one another, to provide the production environment implementing the application.

Herein, the term "system" can be, but is not limited to, any data management system implemented on a computing system, accessed through one or more servers, accessed through a network, accessed through a cloud, and/or provided through any system or by any means, as discussed herein, and/or as known in the art at the time of filing, and/or as developed after the time of filing, that gathers/obtains data from one or more sources, provides data to one or more sources, and/or has the capability to analyze at least part of the data.

The term "system" includes, but is not limited to, any system that provides a product and/or user support service and is implemented on a computing system, accessed through one or more servers, accessed through a network, accessed through a cloud, and/or provided through any computing system or by any means as discussed herein, as known in the art at the time of filing, and/or as developed after the time of filing.

As used herein, the term "system" includes, but is not limited to, the following: web-based, online, and/or computing system implemented systems, services, packages, programs, modules, or applications, whether known at the time of filing or as developed later.

As specific illustrative examples, the assets making up a given production environment can include, but are not limited to, the following: one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more systems used to implement the application in the production environment; and/or any other virtual and/or physical assets/components making up an actual production environment in which an application is deployed, implemented, accessed, and run, e.g., operated, as discussed herein, and/or as known in the art at the time of filing, and/or as developed after the time of filing.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known, "trusted" environments or unknown, "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate an application.

In various embodiments, one or more cloud computing environments are used to create, and/or deploy, and/or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application, service, or intermediary service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal," entity. In various embodiments, the virtual assets can be, but are not limited to, the following: virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing can be implemented as one or more virtual assets.

In one embodiment, two or more assets, such as computing systems and/or virtual assets, and/or two or more computing environments are connected by one or more communications channels including but not limited to, Secure Sockets Layer (SSL) communications channels and various other secure communications channels, and/or distributed computing system networks, such as, but not limited to the following: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, the following: a peer-to-peer network; a hybrid peer-to-peer network; a Local Area Network (LAN); a Wide Area Network (WAN); a public network, such as the Internet; a private network; a cellular network; any general network, communications network, or general network/communications network system; a wireless network; a wired network; a wireless and wired combination network; a satellite network; a cable network; any combination of different network types; and/or any other system capable of allowing communication between two or more assets, virtual assets, and/or computing systems, whether available or known at the time of filing or as later developed.

As used herein, the term "user" includes, but is not limited to, any party, parties, entity, and/or entities using, or otherwise interacting with any of the methods or systems discussed herein. In various embodiments, a user can be, but is not limited to, a person, a commercial entity, an application, a service, and/or a computing system.

For example, in one embodiment, a user is a government entity, a group associated with a government entity, and/or a person associated with a government entity. In one embodiment, a user is a law enforcement agency, a group associated with a law enforcement agency, and/or a person associated with a law enforcement agency. In one embodiment, a user is a military unit, a group associated with a military unit, and/or a person associated with a military unit.

In one embodiment, a user is an auto body shop, a group associated with an auto body shop, and/or a person associated with an auto body shop. In one embodiment the term "auto body shop" includes any entity providing repair and maintenance services for vehicles including cars, trucks, motorcycles, vans, semis, boats, airplanes, and/or helicopters. In one embodiment, an auto body shop includes a garage, a motorcycle garage, an automotive garage, a repair shop, an automobile repair shop, and/or a motorcycle repair shop.

For example, in one embodiment, a user is an insurance company, a group associated with an insurance company, and/or a person associated with an insurance company, such as an insurance agent. As used herein, the term "insurance company," "insurance agency," and "insurance agent" are used interchangeably.

In one embodiment, a user is a group of general public members and/or an individual member of the public.

In one embodiment, a user is a bus driver. In one embodiment, a user is a taxi driver. In one embodiment, a user is a shuttle driver.

Herein, the term "user experience" includes any aspect of human-software interaction, including data entry. In one embodiment, a user experience includes one or more user experience elements.

Herein, the term "user experience element" includes a user experience component. As used herein, the term "user experience element" includes a user experience component or components provided or displayed to the user such as, but not limited to, user interfaces and/or interface displays, and/or any other user experience element that individually, or in combination, create a user experience, as discussed herein, and/or as known in the art at the time of filing, and/or as developed after the time of filing.

In various embodiments, the term "alert" includes an e-mail, text message, SMS message, phone call, postal message, and/or one or more notifications as discussed herein, and/or as known in the art at the time of filing, and/or as made available/developed after the time of filing.

DETAILED DISCLOSURE

Embodiments will now be discussed with reference to the accompanying figures, which depict one or more exemplary embodiments. Embodiments may be implemented in many different forms and should not be construed as limited to the embodiments set forth herein, shown in the figures, and/or described below. Rather, these exemplary embodiments are provided to allow a complete disclosure that conveys the principles of the invention, as set forth in the claims, to those of skill in the art.

Embodiments of the present disclosure provide a vehicle search system that addresses some of the shortcomings associated with traditional hit-and-run investigations by providing a computer implemented method and system of aggregating vehicle data to support hit-and-run investigations.

Vehicles involved in hit-and-run accidents often suffer damage as a result of the collision. Thus, these vehicles are often taken to auto body shops. In various embodiments, vehicle data associated with these damaged vehicles is gathered from the auto body shops and stored in a database within the vehicle search system.

In one embodiment, law enforcement agencies investigating hit-and-run accidents identify a target vehicle of interest. In one embodiment, a target vehicle is a vehicle identified by an eyewitness of a hit-and-run as having been involved in the collision.

In one embodiment, law enforcement agencies access the vehicle search system to provide search data representing one or more characteristics associated with the target vehicle.

In one embodiment, the vehicle search system searches existing vehicle data to identify vehicle data matching the search data.

In one embodiment, the vehicle search system performs one or more searches after the search data is received. For example, in one embodiment, a law enforcement agency provides search data on Day 1. In one embodiment, the vehicle search system performs a search on Day 1, on Day 2, on Day 3, on Day 4, and so on.

In one embodiment, if the vehicle search system identifies vehicle data matching the search data, the vehicle search system alerts the law enforcement agency that one or more vehicles having one or more characteristics matching the one or more characteristics associated with the target vehicle have been identified by providing alert data to the law enforcement.

In one embodiment, if the vehicle search system does not identify vehicle data matching the search data, the vehicle search system provides alert data to the law enforcement agency to inform the law enforcement agency that no vehicles having one or more characteristics matching the one or more characteristics associated with the target vehicle have been identified.

FIG. 1 illustrates an example of a production environment 100 configured to aggregate vehicle data to support law enforcement investigations, according to one embodiment. In one embodiment, production environment 100 is configured to accept search data from a law enforcement agency regarding hit-and-run accidents and vehicle data from an auto body shop. In one embodiment, production environment 100 is configured to generate alert data to alert the law enforcement agency when the search data matches the vehicle data provided by the auto body shop.

In one embodiment, production environment 100 is configured to accept search data from an insurance company. In one embodiment, production environment 100 is configured to generate alert data to alert the insurance company when the search data matches the vehicle data provided by the auto body shop.

In one embodiment, production environment 100 is configured to accept vehicle data from an insurance company.

In one embodiment, production environment 100 includes a network 101, a system 110, an auto body shop system 140, and a law enforcement system 150.

In one embodiment, the network 101 includes communication channels 102, 103, and 104.

In one embodiment, the system 110 includes a system engine 113, memory 115, processors 117, vehicle data 121, search module 119, input module 123, and alert module 127.

In one embodiment, input module 119 includes vehicle data 121.

In one embodiment, an auto body shop provides the vehicle data 121 to the input module 119.

In one embodiment, the vehicle data 121 includes data representing one or more characteristics associated with one or more vehicles. In one embodiment, the vehicle data 121 includes data representing a vehicle type. In one embodiment, the vehicle data 121 includes data representing a vehicle make. In one embodiment, the vehicle data 121 includes data representing a vehicle model. In one embodiment, the vehicle data 121 includes data representing a vehicle color. In one embodiment, the vehicle data 121 includes data representing a geographic region.

In one embodiment, the vehicle data 121 includes data representing a vehicle year. In one embodiment, the vehicle year is the year in which a vehicle was manufactured. In one embodiment, the vehicle year is the year in which a vehicle was sold. In one embodiment, the vehicle year is the model year as defined by a vehicle manufacturer.

In one embodiment, the vehicle data 121 includes data representing a license plate number. In one embodiment, the vehicle data 121 includes data representing a vehicle identification number (VIN). In one embodiment, the vehicle data 121 includes data representing one or more vehicle identifying marks. In one embodiment, the vehicle data 121 includes data representing vehicle damage. In one embodiment, vehicle damage includes body damage to the vehicle.

In one embodiment, search module 123 includes search data 125.

In one embodiment, a law enforcement agency provides the search data 125 to the search module 123.

In one embodiment, the search data 125 includes data representing one or more characteristics associated with one or more target vehicles. In one embodiment, the one or more target vehicles are one or more vehicles potentially associated with a hit-and-run accident.

In one embodiment, the search data 125 includes data representing a target vehicle type. In one embodiment, the search data 125 includes data representing a target vehicle make. In one embodiment, the search data 125 includes data representing a target vehicle model. In one embodiment, the search data 125 includes data representing a target vehicle color. In one embodiment, the search data 125 includes data representing a target vehicle geographic region.

In one embodiment, the search data 125 includes data representing a target vehicle year. In one embodiment, the target vehicle year is the year in which a target vehicle was manufactured. In one embodiment, the target vehicle year is the year in which a target vehicle was sold. In one embodiment, the target vehicle year is the target model year as defined by a vehicle manufacturer.

In one embodiment, the search data 125 includes data representing a license plate number. In one embodiment, the search data 125 includes data representing a vehicle identification number (VIN). In one embodiment, the search data 125 includes data representing one or more target vehicle identifying marks. In one embodiment, the search data 125 includes data representing target vehicle damage. In one embodiment, target vehicle damage includes body damage to the target vehicle.

In one embodiment, the search module 123 provides one or more user experience elements to a law enforcement user to receive search data.

In one embodiment, alert module 127 includes alert data 129. In one embodiment, an alert mechanism provides the alert data 129 to the law enforcement user. In one embodiment, the alert mechanism is an e-mail message. In one embodiment, the alert mechanism is a pop-up display. In one embodiment, the alert mechanism is a graphic display. In one embodiment, the alert mechanism is a text message. In one embodiment, the alert mechanism is a phone call or message. In one embodiment, the alert mechanism is an instant message. In one embodiment, the alert mechanism is a printed message.

In one embodiment, the auto body shop system 140 includes auto body shop application 141 installed on the auto body shop system 140, to enable an auto body shop user to interact with the system 110. In one embodiment, the auto body shop system 140 is a desktop computing system. In one embodiment, the auto body shop system 140 is a mobile computing system. In one embodiment, the auto body shop system 140 is a network of mobile and/or desktop computing systems.

In one embodiment, the law enforcement system 150 includes law enforcement application 151 installed on the law enforcement system 150, to enable a law enforcement user to interact with the system 110. In one embodiment, the law enforcement system 150 is a mobile computing system. In one embodiment, the law enforcement system 150 is a network of mobile and/or desktop computing systems.

The auto body shop system 140 and the law enforcement system 150 are representative of one or more of a plurality of systems/devices with which users of the system 110 can use to access, interact with, and receive services from the system 110, according to one embodiment.

Figure 2:
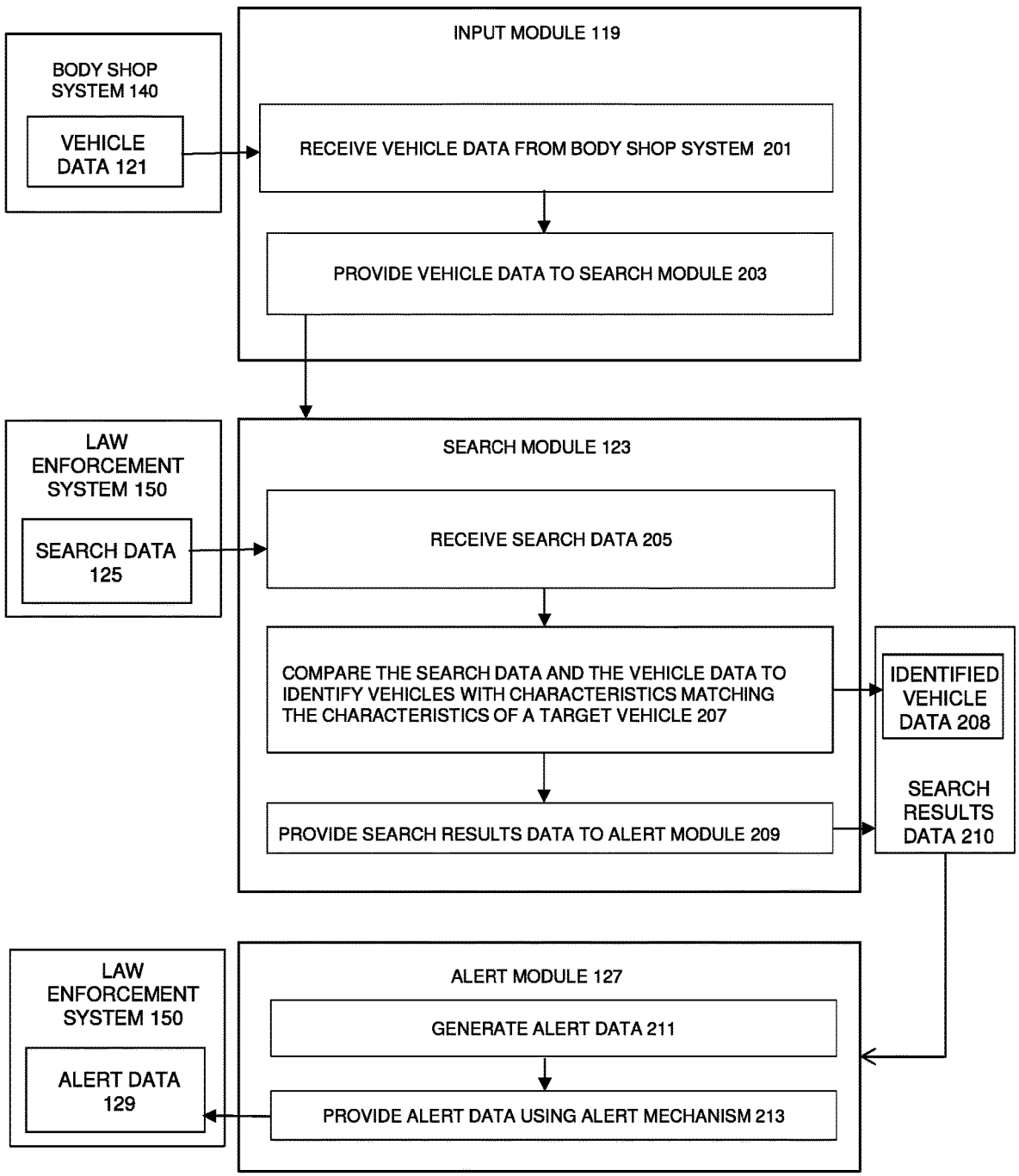
FIG. 2 is a flow diagram of an example of a process of aggregating vehicle data to support vehicle investigations, in accordance with one embodiment.

FIG. 2 includes an example of a process 200 of aggregating vehicle data to support vehicle investigations, in accordance with one embodiment. The process 200 includes an input module 119, a search module 123, and an alert module 127 to aggregate vehicle data to support law enforcement investigations, in one embodiment.

At operation 201, the input module 119 receives vehicle data 121 from an auto body shop system 140, in one embodiment.

In one embodiment, the vehicle data 121 includes data representing one or more characteristics associated with one or more vehicles. In one embodiment, the vehicle data 121 includes data representing a vehicle type. In one embodiment, the vehicle data 121 includes data representing a vehicle make. In one embodiment, the vehicle data 121 includes data representing a vehicle model. In one embodiment, the vehicle data 121 includes data representing a vehicle color. In one embodiment, the vehicle data 121 includes data representing geographic region.

In one embodiment, the vehicle data 121 includes data representing a vehicle year. In one embodiment, the vehicle year is the year in which a vehicle was manufactured. In one embodiment, the vehicle year is the year in which a vehicle was sold. In one embodiment, the vehicle year is the model year as defined by a vehicle manufacturer.

In one embodiment, the vehicle data 121 includes data representing a license plate number. In one embodiment, the vehicle data 121 includes data representing a vehicle identification number (VIN). In one embodiment, the vehicle data 121 includes data representing one or more vehicle identifying marks. In one embodiment, the vehicle data 121 includes data representing vehicle damage. In one embodiment, vehicle damage includes body damage to the vehicle.

At operation 203, the vehicle data 121 is provided to the search module 123, in one embodiment.

At operation 205, the search module 123 receives search data 125 from law enforcement system 150, in one embodiment. In one embodiment, search data 125 includes data representing one or more characteristics associated with one or more target vehicles.

In one embodiment, the one or more target vehicles are one or more vehicles potentially associated with a hit-and-run accident.

In one embodiment, the search data 125 includes data representing a target vehicle type. In one embodiment, the search data 125 includes data representing a target vehicle make. In one embodiment, the search data 125 includes data representing a target vehicle model. In one embodiment, the search data 125 includes data representing a target vehicle color. In one embodiment, the search data 125 includes data representing target vehicle geographic region.

In one embodiment, the search data 125 includes data representing a target vehicle year. In one embodiment, the target vehicle year is the year in which a target vehicle was manufactured. In one embodiment, the target vehicle year is the year in which a target vehicle was sold. In one embodiment, the target vehicle year is the target model year as defined by a vehicle manufacturer.

In one embodiment, the search data 125 includes data representing a license plate number. In one embodiment, the search data 125 includes data representing a target vehicle identification number (VIN). In one embodiment, the search data 125 includes data representing one or more target vehicle identifying marks. In one embodiment, the search data 125 includes data representing target vehicle damage. In one embodiment, target vehicle damage includes body damage to the target vehicle.

At operation 207, the search data 125 and the vehicle data 121 are compared to identify vehicles with characteristics matching the characteristics of the target vehicle, in one embodiment. In one embodiment, search module 123 generates identified vehicle data 208, the identified vehicle data 208 representing one or more identified vehicles.

In one embodiment, the search module 123 generates search results data 210. In one embodiment, the search results data 210 includes identified vehicle data 208.

At operation 209, the search results data 210 is provided to the alert module 127, in one embodiment.

In one embodiment, at operation 211, the alert module 127 generates alert data 129 using search results data 210.

In one embodiment, at operation 213, the alert module 127 provides the alert data 129 to the law enforcement system 150 using an alert mechanism.

In one embodiment, the alert mechanism is an e-mail message. In one embodiment, the alert mechanism is a pop-up display. In one embodiment, the alert mechanism is a graphic display. In one embodiment, the alert mechanism is a text message. In one embodiment, the alert mechanism is a phone call or message. In one embodiment, the alert mechanism is an instant message. In one embodiment, the alert mechanism is a printed message.

In one embodiment, the law enforcement system 150 that provides the search data 125 to the search module 123 is the same system as the law enforcement system 150 that receives the alert data 129 from the alert module 127. In one embodiment, the law enforcement system 150 that provides the search data 125 to the search module 123 is a different system than the law enforcement system 150 that receives the alert data 129 from the alert module 127.

Figure 3A:
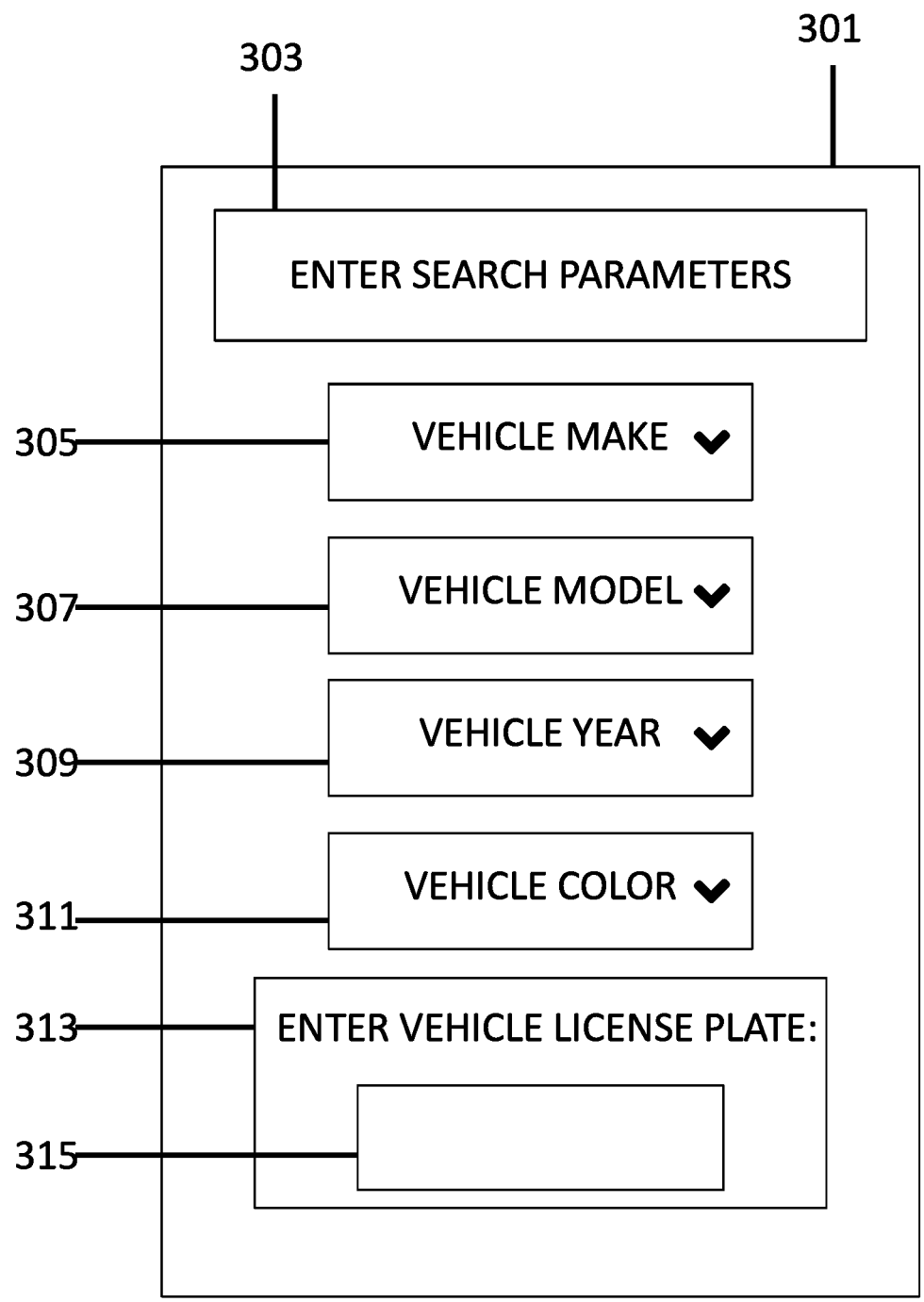
FIGS. 3A and 3B are examples of a search interface provided to a user, in one embodiment.
Figure 3B:
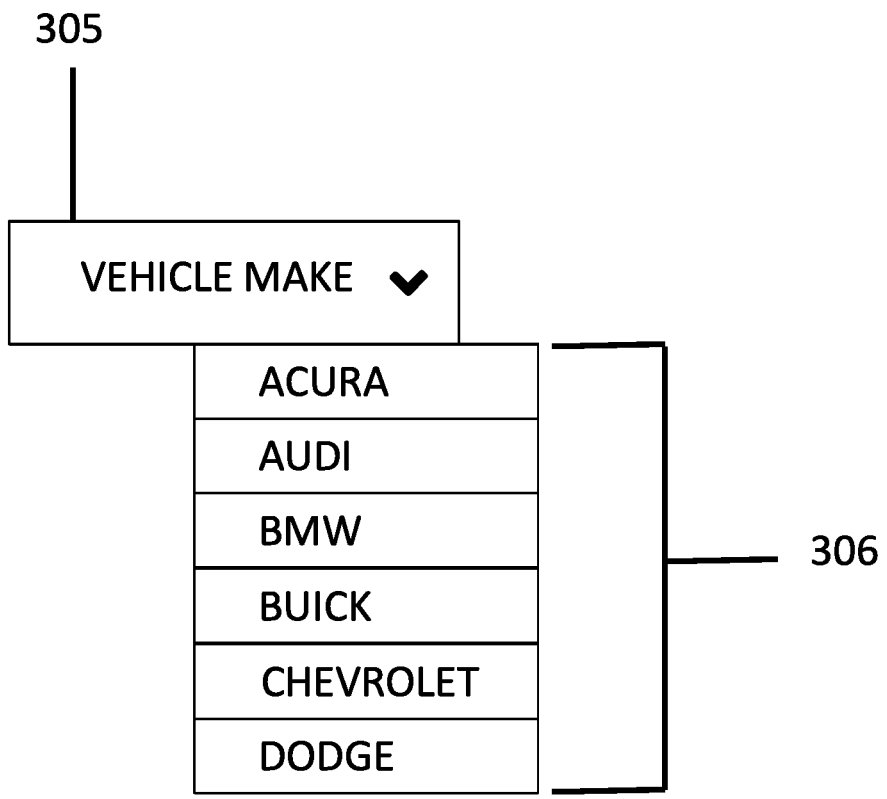

FIGS. 3A and 3B are examples of a search interface provided to a user, in one embodiment.

FIG. 3A illustrates an example of a search interface 301, in accordance with one embodiment. In one embodiment, the search interface 301 provides one or more user experience elements with which a user may interact to provide search data to a vehicle search system.

In one embodiment, the search interface 301 includes search parameters box 303. In one embodiment, the search parameters box 303 instructs the user to enter the search parameters.

In one embodiment, the search interface 301 includes drop down menus 305, 307, 309, and 311.

In one embodiment, the drop down menu 305 allows the user to select the make of the target vehicle. FIG. 3B illustrates the drop down menu 305. As seen in FIG. 3B, in one embodiment, the drop down menu 305 includes multiple variations of vehicle make option 306. In one embodiment, the user selects one or more of the vehicle make option 306 to provide search data to the vehicle search system.

For example, in one embodiment, a law enforcement officer interviews an eyewitness to a hit-and-run incident who saw a person driving a BMW hit a pedestrian and flee the scene of the accident. In one embodiment, the law enforcement officer can select a BMW vehicle make option 306 to provide vehicle data indicating the BMW vehicle make to the vehicle search system.

Turning back to FIG. 3A, in one embodiment, the drop down menu 307 allows the user to select the model of the target vehicle.

In one embodiment, the drop down menu 309 allows the user to select the year of the target vehicle.

In one embodiment, the drop down menu 311 allows the user to select the color of the target vehicle.

In one embodiment, the search interface 301 includes instruction box 313. In one embodiment, the instruction box 313 instructs the user to provide a vehicle license plate number.

In one embodiment, the instruction box 313 includes data field 315. In one embodiment, the user enters vehicle data representing the vehicle license plate number associated with the target vehicle into data field 315.

Figure 4:
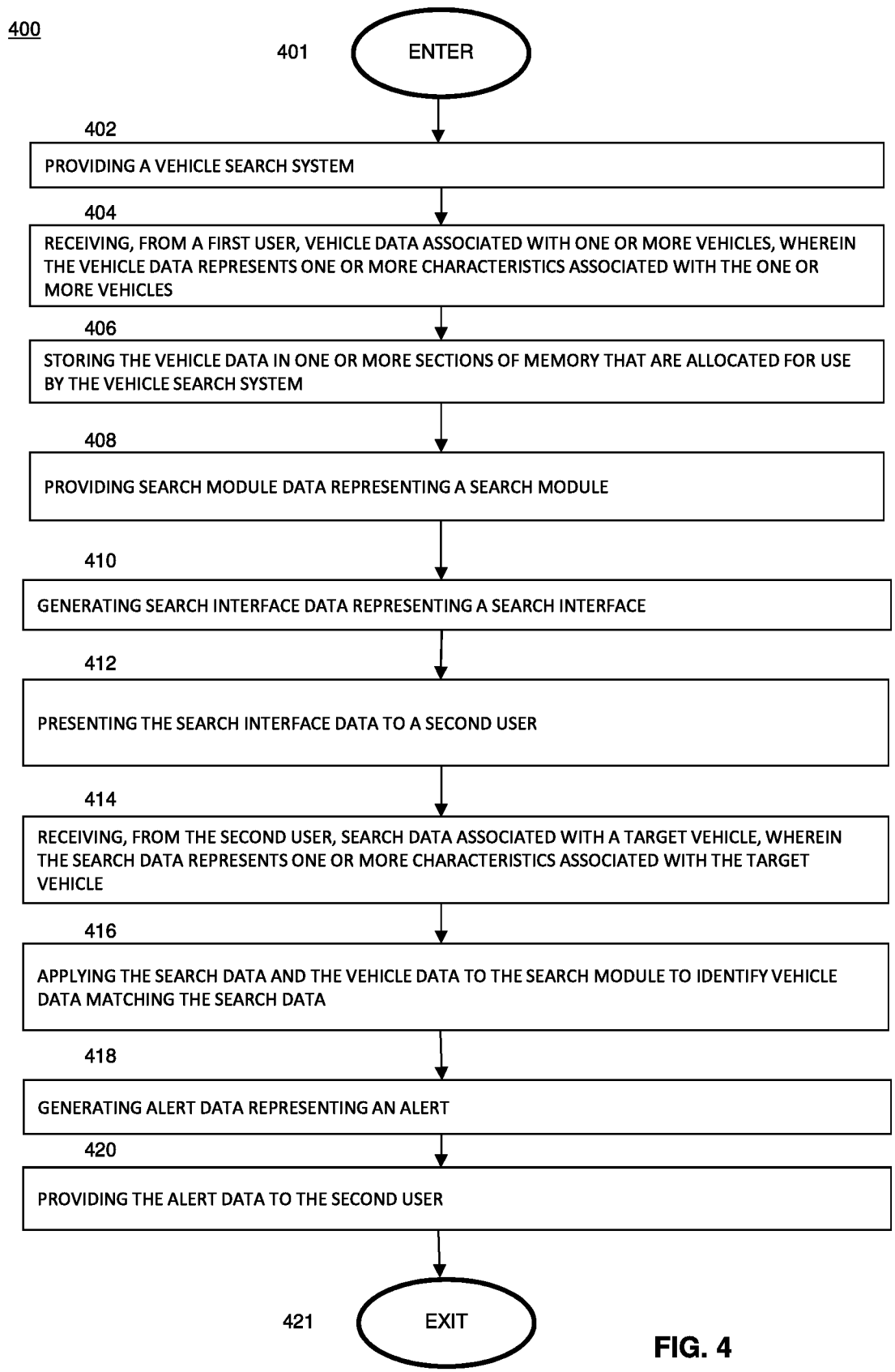
FIG. 4 is a flow diagram of an example of a process of aggregating vehicle data to support vehicle investigations, according to one embodiment.

FIG. 4 illustrates an example flow diagram of a process 400 of aggregating vehicle data to support vehicle investigations, according to one embodiment. In one embodiment, the process 400 of aggregating vehicle data to support vehicle investigations begins at ENTER OPERATION 401 and proceeds to PROVIDING A VEHICLE SEARCH SYSTEM OPERATION 402.

In one embodiment, a vehicle search system is provided. In one embodiment, the vehicle search system receives vehicle data from auto body shops and/or insurance companies, aggregates the vehicle data, and receives search data from law enforcement agencies and/or insurance companies.

In one embodiment, the vehicle search system receives vehicle data from auto body shops, aggregates the vehicle data, and receives search data from law enforcement agencies.

In one embodiment, once the vehicle search system is provided at PROVIDING A VEHICLE SEARCH SYSTEM OPERATION 402, operation flow proceeds to RECEIVING, FROM A FIRST USER, VEHICLE DATA ASSOCIATED WITH ONE OR MORE VEHICLES, WHEREIN THE VEHICLE DATA REPRESENTS ONE OR MORE CHARACTERISTICS ASSOCIATED WITH THE ONE OR MORE VEHICLES OPERATION 404.

In one embodiment, vehicle data associated with one or more vehicles is received from a first user. In one embodiment, the first user includes an auto body shop. In one embodiment, the first user includes a mechanic. In one embodiment, the first user includes an insurance company.

In one embodiment, the one or more vehicles include vehicles brought to the auto body shop for repairs.

In one embodiment, the vehicle data includes data representing one or more characteristics associated with the one or more vehicles. In one embodiment, the vehicle data includes data representing a vehicle type. In one embodiment, the vehicle data includes data representing a vehicle make. In one embodiment, the vehicle data includes data representing a vehicle model. In one embodiment, the vehicle data includes data representing a vehicle color. In one embodiment, the vehicle data includes data representing geographic region.

In one embodiment, the vehicle data includes data representing a vehicle year. In one embodiment, the vehicle year is the year in which a vehicle was manufactured. In one embodiment, the vehicle year is the year in which a vehicle was sold. In one embodiment, the vehicle year is the model year as defined by a vehicle manufacturer.

In one embodiment, the vehicle data includes data representing a license plate number. In one embodiment, the vehicle data includes data representing a vehicle identification number (VIN). In one embodiment, the vehicle data includes data representing one or more vehicle identifying marks. In one embodiment, the vehicle data includes data representing vehicle damage. In one embodiment, vehicle damage includes body damage to the vehicle.

In one embodiment, once the vehicle data associated with the one or more vehicles is received at RECEIVING, FROM A FIRST USER, VEHICLE DATA ASSOCIATED WITH ONE OR MORE VEHICLES, WHEREIN THE VEHICLE DATA REPRESENTS ONE OR MORE CHARACTERISTICS ASSOCIATED WITH THE ONE OR MORE VEHICLES OPERATION 404, operation flow proceeds to STORING THE VEHICLE DATA IN ONE OR MORE SECTIONS OF MEMORY THAT ARE ALLOCATED FOR USE BY THE VEHICLE SEARCH SYSTEM OPERATION 406.

In one embodiment, the vehicle data is stored in one or more sections of memory that are allocated for use by the vehicle search system.

In one embodiment, once the vehicle data is stored in the one or more sections of memory that are allocated for use by the vehicle search system at STORING THE VEHICLE DATA IN ONE OR MORE SECTIONS OF MEMORY THAT ARE ALLOCATED FOR USE BY THE VEHICLE SEARCH SYSTEM OPERATION 406, operation flow proceeds to PROVIDING SEARCH MODULE DATA REPRESENTING A SEARCH MODULE OPERATION 408.

In one embodiment, search module data representing a search module is provided.

In one embodiment, once search module data representing a search module is provided at PROVIDING SEARCH MODULE DATA REPRESENTING A SEARCH MODULE OPERATION 408, operation flow proceeds to GENERATING SEARCH INTERFACE DATA REPRESENTING A SEARCH INTERFACE OPERATION 410.

In one embodiment, search interface data representing a search interface is generated.

In one embodiment, search interface data includes data representing one or more user experience elements. In one embodiment, the one or more user experience elements include a user interface. In one embodiment, the one or more user experience elements include a drop down menu. In one embodiment, the one or more user experience elements include a data entry field.

In one embodiment, once the search interface data representing a search interface is generated at GENERATING SEARCH INTERFACE DATA REPRESENTING A SEARCH INTERFACE OPERATION 410, operation flow proceeds to PRESENTING THE SEARCH INTERFACE DATA TO A SECOND USER OPERATION 412.

In one embodiment, the search interface data is presented to a second user. In one embodiment, the second user is a law enforcement agency. In one embodiment, the second user is a law enforcement officer. In one embodiment, the second user is a government entity. In one embodiment, the second user is an insurance company.

In one embodiment, the second user is any entity and/or person seeking to search for one or more vehicles with body damage.

In one embodiment, once the search interface data is presented to the second user at PRESENTING THE SEARCH INTERFACE DATA TO A SECOND USER OPERATION 412, operation flow proceeds to RECEIVING, FROM THE SECOND USER, SEARCH DATA ASSOCIATED WITH A TARGET VEHICLE, WHEREIN THE SEARCH DATA REPRESENTS ONE OR MORE CHARACTERISTICS ASSOCIATED WITH THE TARGET VEHICLE OPERATION 414.

In one embodiment, search data associated with a target vehicle is received from the second user. In one embodiment, the target vehicle is a vehicle potentially associated with a hit-and-run accident.

In one embodiment, the search data represents one or more characteristics associated with a target vehicle.

In one embodiment, the search data includes data representing a target vehicle type. In one embodiment, the search data includes data representing a target vehicle make. In one embodiment, the search data includes data representing a target vehicle model. In one embodiment, the search data includes data representing target a vehicle color. In one embodiment, the search data includes data representing geographic region.

In one embodiment, the search data includes data representing a target vehicle year. In one embodiment, the target vehicle year is the year in which the target vehicle was manufactured. In one embodiment, the vehicle year is the year in which the target vehicle was sold. In one embodiment, the target vehicle year is the model year as defined by a vehicle manufacturer.

In one embodiment, the search data includes data representing a license plate number associated with the target vehicle. In one embodiment, the search data includes data representing a vehicle identification number (VIN) of the target vehicle. In one embodiment, the search data includes data representing one or more target vehicle identifying marks. In one embodiment, the search data includes data representing target vehicle damage. In one embodiment, target vehicle damage includes body damage to the target vehicle.

In one embodiment, once the search data associated with the target vehicle is received from the second user at RECEIVING, FROM THE SECOND USER, SEARCH DATA ASSOCIATED WITH A TARGET VEHICLE, WHEREIN THE SEARCH DATA REPRESENTS ONE OR MORE CHARACTERISTICS ASSOCIATED WITH THE TARGET VEHICLE OPERATION 414, operation flow proceeds to APPLYING THE SEARCH DATA AND THE VEHICLE DATA TO THE SEARCH MODULE TO IDENTIFY VEHICLE DATA MATCHING THE SEARCH DATA OPERATION 416.

In one embodiment, the search data and the vehicle data are applied to the search module to identify vehicle data matching the search data.

In one embodiment, identified vehicle data representing one or more vehicles having characteristics matching characteristics of the target vehicle is generated.

In one embodiment, once the search data and the vehicle data is applied to the search module at APPLYING THE SEARCH DATA AND THE VEHICLE DATA TO THE SEARCH MODULE TO IDENTIFY VEHICLE DATA MATCHING THE SEARCH DATA OPERATION 416, operation flow proceeds to GENERATING ALERT DATA REPRESENTING AN ALERT OPERATION 418.

In one embodiment, alert data representing an alert is generated. In one embodiment, the alert includes information about the one or more identified vehicles. In one embodiment, the alert includes information about the one or more characteristics of the one or more identified vehicles.

In one embodiment, once the alert data representing the alert is generated at GENERATING ALERT DATA REPRESENTING AN ALERT OPERATION 418, operation flow proceeds to PROVIDING THE ALERT DATA TO THE SECOND USER OPERATION 420.

In one embodiment, the alert data is provided to the second user.

An example of an alert, in one embodiment, is provided in FIG. 5. In one embodiment, the alert data is provided to the second user with an alert mechanism.

In one embodiment, the alert mechanism is an e-mail message. In one embodiment, the alert mechanism is a pop-up display. In one embodiment, the alert mechanism is a graphic display. In one embodiment, the alert mechanism is a text message. In one embodiment, the alert mechanism is a phone call or message. In one embodiment, the alert mechanism is an instant message. In one embodiment, the alert mechanism is a printed message.

In one embodiment, once the alert data is provided to the second user at PROVIDING THE ALERT DATA TO THE SECOND USER OPERATION 420, operation flow proceeds to EXIT OPERATION 421.

FIG. 5 is an example of an alert 501. In one embodiment, a user searches for a target vehicle using a vehicle search system. In one embodiment, the vehicle search system searches its database of vehicle data to search for one or more vehicles having characteristics matching characteristics of the target vehicle. In one embodiment, if the vehicle search system identifies a vehicle having characteristics matching characteristics of the target vehicle, the vehicle search system generates alert data to provide the alert 501 to the user.

For example, in one embodiment, a law enforcement officer searches for a target vehicle using a vehicle search system. In one embodiment, the vehicle search system searches its database of vehicle data to search for one or more vehicles having characteristics matching characteristics of the target vehicle. In one embodiment, if the vehicle search system identifies a vehicle having characteristics matching characteristics of the target vehicle, the vehicle search system generates alert data to provide the alert 501 to the law enforcement officer.

In one embodiment, an insurance company searches for a target vehicle using a vehicle search system. In one embodiment, the vehicle search system searches its database of vehicle data to search for one or more vehicles having characteristics matching characteristics of the target vehicle. In one embodiment, if the vehicle search system identifies a vehicle having characteristics matching characteristics of the target vehicle, the vehicle search system generates alert data to provide the alert 501 to the insurance company.

In one embodiment, the existence of the identified vehicle having characteristics matching characteristics of the target vehicle is brought to the user's attention via email message 503.

In one embodiment, the email message 503 includes a link 505, the link 505 allowing the user access to more information about the vehicle having characteristics matching characteristics of the target vehicle.

In one embodiment, the alert 501 is provided using an alert mechanism. In one embodiment, the alert mechanism is an e-mail message. In one embodiment, the alert mechanism is a pop-up display. In one embodiment, the alert mechanism is a graphic display. In one embodiment, the alert mechanism is a text message. In one embodiment, the alert mechanism is a phone call or message. In one embodiment, the alert mechanism is an instant message. In one embodiment, the alert mechanism is a printed message.

The embodiments described above provide a powerful tool to law enforcement agencies. In the event of a hit-and-run incident, or anytime a law enforcement agency is attempting to track a vehicle with potential body damage, the law enforcement agency can search the vehicle search system.

Similarly, the embodiments described above provide a powerful tool to insurance companies. Anytime an insurance company seeks to gather information about vehicles, the insurance company can search and/or track vehicles through the vehicle search system.

As discussed in more detail above, using the above embodiments, with little or no modification and/or input, there is considerable flexibility, adaptability, and opportunity for customization to meet the specific needs of various parties under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating," "accessing," "adding," "aggregating," "alerting," "applying," "analyzing," "associating," "calculating," "capturing," "categorizing," "classifying," "comparing," "creating," "defining," "detecting," "determining," "distributing," "eliminating," "encrypting," "extracting," "filtering," "forwarding," "generating," "identifying," "implementing," "informing," "monitoring," "obtaining," "posting," "processing," "providing," "receiving," "requesting," "saving," "sending," "storing," "substituting," "transferring," "transforming," "transmitting," "using," etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the Figures, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented method of aggregating vehicle data to support law enforcement investigations, the method comprising:
   providing a hit and run vehicle search software system;
   providing one or more parties associated with one or more vehicle repair facilities access to the hit and run vehicle search software system;
   receiving, from the one or more parties associated with the one or more vehicle repair facilities, through the hit and run vehicle search software system, vehicle data associated with one or more vehicles brought to the vehicle repair facilities for repair, wherein at least a portion of the vehicle data includes facility location data indicating the location of the vehicle repair facilities;

correlating the vehicle data for each vehicle brought to the vehicle repair facilities with the respective vehicle and the facility location data and storing the correlated vehicle data in one or more sections of memory that are allocated for use by the vehicle search software system;

providing one or more parties associated with one or more law enforcement agencies access to the hit and run vehicle search software system;

receiving, from one or more parties associated with the one or more law enforcement agencies, through the hit and run vehicle search software system, hit and run search data associated with a target vehicle suspected of being involved in a hit and run incident, wherein at least a portion of the hit and run search data associated with the target vehicle includes the location of the hit and run incident;

defining a relevant distance from the location of the hit and run incident and generating relevant radius data representing the relevant distance from the location of the hit and run incident;

processing, using a search module of the hit and run vehicle search software system, the facility location data of each of the vehicle repair facilities and the relevant radius data to identify a relevant subset of vehicle repair facilities that are within the relevant distance from the location of the hit and run incident;

processing, using a search module of the hit and run vehicle search software system, the correlated vehicle data for each facility in the relevant subset of vehicle repair facilities, and the hit and run search data associated with a target vehicle to match at least a portion of the correlated vehicle data to the hit and run search data associated with the target vehicle;

if a match is found between at least a portion of the correlated vehicle data and the hit and run search data associated with a target vehicle, identifying the vehicle associated with the matched portion of the correlated vehicle data;

generating alert data including data identifying the vehicle associated with the matched portion of the correlated vehicle data; and providing the alert data to one or more parties associated with one or more law enforcement agencies.

2. The method of claim 1 wherein the hit and run vehicle search software system comprises one or more search systems selected from the group of search systems consisting of:
   a desktop computing system implemented search system;
   a mobile computing system implemented search system;
   a network accessed search system;
   a web-based intermediary search system; and
   a cloud-based intermediary search system.

3. The method of claim 1 wherein the vehicle data associated with one or more vehicles brought to the vehicle repair facilities for repair includes one or more of:
   type of the vehicle;
   make of the vehicle;
   model of the vehicle;
   color of the vehicle;
   year in which the vehicle was manufactured;
   year in which the vehicle was sold;
   model year of the vehicle;
   geographic region associated with the vehicle;
   license plate number associated with the vehicle;
   vehicle identification number (VIN) of the vehicle;
   data representing damage to the vehicle; and
   any other identifying features of the vehicle, if present.

4. The method of claim 1 wherein the hit and run search data associated with a target vehicle suspected of being involved in a hit and run incident includes one or more of:
   type of the target vehicle;
   make of the target vehicle;
   model of the target vehicle;
   color of the target vehicle;
   year in which the target vehicle was manufactured;
   year in which the target vehicle was sold;
   model year of the target vehicle;
   geographic region associated with the target vehicle;
   license plate number associated with the target vehicle;
   vehicle identification number (VIN) of the target vehicle;
   data representing expected or known damage to the target vehicle; and
   any other identifying features of the target vehicle if present.

5. The method of claim 1 wherein providing the alert data to the one or more parties associated with one or more law enforcement agencies includes using one or more alert mechanisms selected from the group of alert mechanisms consisting of:
   an e-mail message;
   a pop-up display;
   a graphic display;
   a text message;
   a phone call or message;
   an instant message; and
   a printed message.

6. The method of claim 1 wherein processing the correlated vehicle data and the hit and run search data associated with a target vehicle to match at least a portion of the correlated vehicle data to the hit and run search data associated with a target vehicle is performed periodically until one or more events occur, the one or more events including:
   a match is found between at least a portion of the correlated vehicle data and the hit and run search data associated with a target vehicle;
   a predetermined period of time has passed since a hit and run search was initiated; and
   a hit and run search is halted by one or more parties associated with one or more law enforcement agencies.

* * * * *